(12) United States Patent
Abbott, Jr. et al.

(10) Patent No.: US 10,857,727 B2
(45) Date of Patent: Dec. 8, 2020

(54) MATERIAL SETS

(71) Applicant: Hewlett-Packard Development Company, L.P., Houston, TX (US)

(72) Inventors: James Elmer Abbott, Jr., Albany, OR (US); Vladek Kasperchik, Corvallis, OR (US); David A. Champion, Lebanon, OR (US); James P. Shields, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 114 days.

(21) Appl. No.: 16/169,443

(22) Filed: Oct. 24, 2018

(65) Prior Publication Data

US 2019/0054691 A1  Feb. 21, 2019

Related U.S. Application Data

(63) Continuation of application No. 16/095,934, filed as application No. PCT/US2016/043083 on Jul. 20, 2016.

(51) Int. Cl.
*B29C 64/165* (2017.01)
*B22F 1/00* (2006.01)
(Continued)

(52) U.S. Cl.
CPC ............. *B29C 64/165* (2017.08); *B22F 1/007* (2013.01); *B22F 1/0059* (2013.01);
(Continued)

(58) Field of Classification Search
CPC .............................. B29C 64/40; B29C 64/165
See application file for complete search history.

(56) References Cited

U.S. PATENT DOCUMENTS 9,011,982 B2   4/2015  Muller et al.
2004/0239009 A1  12/2004  Collins et al.
(Continued)

FOREIGN PATENT DOCUMENTS

DE   102011121568 A1   6/2013
RU   2009143542         5/2011
(Continued)

OTHER PUBLICATIONS

International Search Report and Written Opinion for International Application No. PCT/US2016/043083 dated May 4, 2017, 7 pages.

*Primary Examiner* — Alexandre F Ferre
(74) *Attorney, Agent, or Firm* — HPI Patent Department

(57) ABSTRACT

The present disclosure is drawn to material sets, methods and printed articles and container supports. In one example, a material set can include a particulate fusible build material having an average particle size ranging from about 0.01 μm to about 200 μm, wherein the particulate fusible build material is a polymer powder, a metal composite powder, or a combination thereof. A fusing ink includes a fusing agent in a first liquid vehicle, wherein the fusing agent fuses the particulate fusible build material when exposed to electromagnetic energy or thermal energy. A binding ink includes a binding agent in a second liquid vehicle, wherein the binding agent temporarily binds the fusible build material when exposed to moderate temperatures ranging from ambient to 150° C.

15 Claims, 4 Drawing Sheets

(51) Int. Cl.
    *B29C 64/40*     (2017.01)
    *B33Y 70/00*     (2020.01)
    *B33Y 10/00*     (2015.01)
    *B29C 64/393*     (2017.01)

(52) U.S. Cl.
    CPC .......... *B22F 1/0062* (2013.01); *B22F 1/0074* (2013.01); *B29C 64/40* (2017.08); *B33Y 70/00* (2014.12); *B22F 2304/10* (2013.01); *B29C 64/393* (2017.08); *B33Y 10/00* (2014.12)

(56) References Cited

U.S. PATENT DOCUMENTS

| | | | |
|---|---|---|---|
| 2005/0017394 A1* | 1/2005 | Hochsmann | B29C 64/165 264/113 |
| 2007/0238056 A1* | 10/2007 | Baumann | B29C 64/165 430/325 |
| 2013/0216836 A1 | 8/2013 | Grebe et al. | |
| 2014/0144583 A1 | 5/2014 | Hakansson et al. | |

FOREIGN PATENT DOCUMENTS

| | | |
|---|---|---|
| WO | WO 01/68375 | 9/2001 |
| WO | WO-2012036767 A2 | 3/2012 |
| WO | WO-2014197086 A1 | 12/2014 |
| WO | WO 2015/056231 | 4/2015 |
| WO | WO-2015191759 A1 | 12/2015 |
| WO | WO-2016013198 A1 | 1/2016 |
| WO | WO 2016/048380 | 3/2016 |
| WO | WO 2016/077250 | 5/2016 |

\* cited by examiner

MATERIAL SETS

CROSS-REFERENCE TO RELATED APPLICATIONS

This application is a continuation of U.S. application Ser. No. 16/095,934, filed Oct. 23, 2018, which is itself a 35 U.S.C. § 371 national phase of International Application S.N. PCT/US2016/043083, filed Jul. 20, 2016, each of which is incorporated by reference herein in its entirety.

BACKGROUND

Methods of three-dimensional (3D) printing, a type of additive manufacturing, have continued to develop over the last few decades. Various methods for powder bed 3D printing include powder bed and liquid printing, selective laser sintering, selective laser melting, electron beam melting, as well as others. The area of powder bed and liquid printing is growing and evolving. The demand for new techniques and materials for powder bed and liquid printing has increased as the area continues to expand and evolve.

Figure 1:
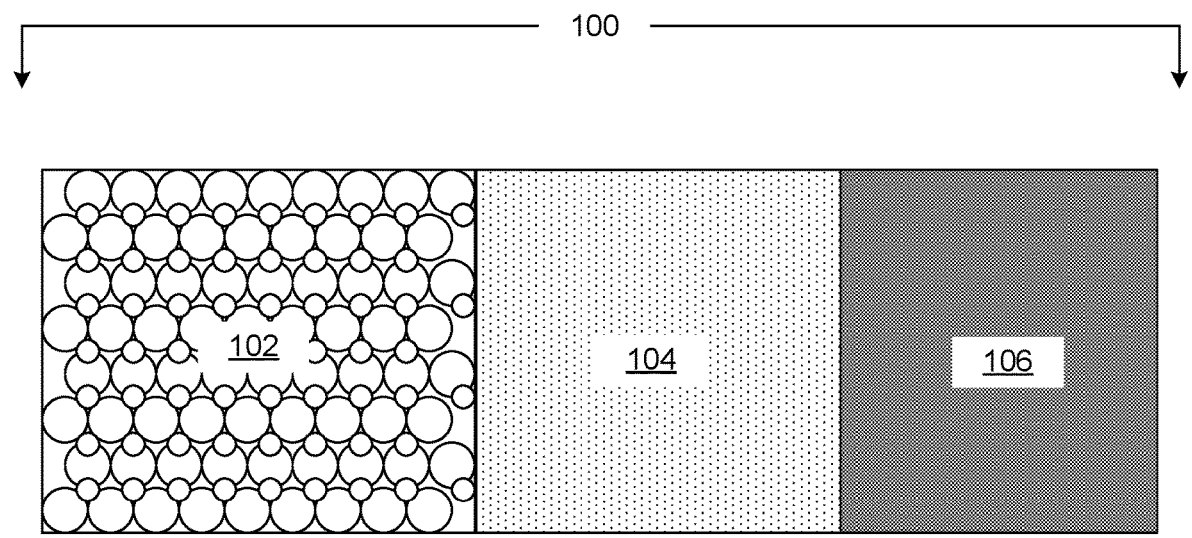
FIG. 1 schematically displays an example material set including a particulate fusible build material, a fusing ink, and a binding ink in accordance with the present disclosure.

The figures depict examples of the presently disclosed technology. However, it is understood that the present technology is not limited to the examples depicted.

DETAILED DESCRIPTION

In powder bed and liquid printing, a liquid functional material is used for patterning a printed object using build material powder bed volume. For example, a liquid functional material can be applied as a two-dimensional pattern over each single layer of an object being printed over a powder bed of a loose powder material. After each layer of the liquid functional material is applied over the powder surface, the powder bed is lowered and fresh layer of the loose powder material is added on top. After a number of cycles, a 3D printed article may be formed. In some examples, the printed article is patterned inside the powder bed in unfinished form (forming a so-called green body) which may have very weak mechanical properties which benefits from additional processing. Thus, very often the printed article can be further subjected to treatments to produce the finished article.

Unfortunately, with certain materials and processing methods, powder bed and liquid printing can be somewhat limited due to the delicate nature of the powder bed, the range of materials available for 3D printing, and/or the fragile nature of the green body if further treatments are used to produce the fully fused finished article. For example, some of these methods include supporting each layer of the printed article during the layer by layer printing process in order to minimize deformation of the powder bed, properly aligning the individual layers of the printed article despite disturbances in the powder bed from indexing down, and/or maximizing the support provided to the printed article. Some further limitations can include the ability to transport the unfused printed article prior to completing for further processing, as in cases where further treatment is part of fusing process, for example. This can be a particular issue when further treatments are not applied directly to the powder bed where it sits for printing, e.g. movement of the unfinished part may be for practical purposes or for other processing purposes.

In one example, the present disclosure is drawn to a material set. The material set can include a particulate fusible build material, a fusing ink, and a binding ink. The particulate fusible build material can have an average particle size ranging from about 0.01 μm to about 200 μm. The fusing ink can include a fusing agent in a first liquid vehicle, wherein the fusing agent fuses the particulate fusible build material when exposed to electromagnetic energy or thermal energy, e.g., resulting in a temperature greater than about 500° C., from 500° C. to 2000° C., from 1000° C. to 2000° C., or from 1400° C. to 2000° C. The binding ink can include a binding agent in a second liquid vehicle, wherein the binding agent temporarily binds the fusible build material when exposed to moderate temperatures ranging from ambient to 150° C.

In another example, a method of 3D printing is presented. The method can include applying a binder ink on a layer by layer basis to a particulate fusible build material to form a container support. Then applying a fusing ink on a layer by layer basis to the particulate fusible build material to form an unfused printed article (e.g., green body printed article) that can be carried by or printed with the container support. The method can further include applying energy to the unfused printed article to form a fused printed article and decoupling the container support from the fused printed article. In one example, the decoupling can occur by crumbling or breaking the container support apart. In other examples, the decoupling can occur as the binder ink and/or binding agent burns off under high temperatures, leaving behind the powder in a pile or degraded shape. In one example, the method can include curing the binder ink with the particulate fusible build material (e.g., drying at ambient or using thermal or electromagnetic energy to raise the temperature above ambient, such as from above ambient to 150° C.) before applying the electromagnetic (e.g., microwave) or thermal energy to the unfused printed article (which may raise the temperature to 500° C. or above, for example). In another example, the method can include transporting the container support and the unfused printed article to a fusing system before applying the energy, e.g., thermal energy and/or electromagnetic energy.

In another example, a printed article and a container support is disclosed. The container support can be formed from a binding ink printed on a particulate fusible build material. The printed article can be formed from a fusing ink printed on a particulate fusible build material to form a green body. The fusing ink can include a fusing agent capable of fusing the particulate fusible build material when exposed to electromagnetic energy or thermal energy, e.g., heating the green body to 500° C. or greater for example. The binding ink can include a binding agent capable of providing rigidity to the particulate build material, but which does not fuse when exposed to the electromagnetic energy or the thermal energy (and in some cases, burns off or degrades with the higher temperature fusing that may occur to fuse the green body into a fused printed article). In one example, the printed green body article can be fused and the container support can remain unfused, or even degrade as the binding agent burns off (yet remain rigid enough prior to fusing to provide a suitable container for transport to a fusing oven or other fusing system).

Turning now to the material set. In one example, the material set 100, can include a particulate fusible build material 102, a fusing ink 104, and a binding ink 106. See FIG. 1. In one example, the particulate fusible build material can include a ceramic powder, a polymer powder, a metal composite powder, a glass powder, or a combination thereof.

Thus, the particulate fusible build material can be a ceramic powder. In one example, the ceramic powder can include an oxide, a nitride, a carbide, an aluminum oxide, aluminum-calcium-phosphorus oxides, bioglasses, boron nitride, boron carbide, borosilicate glass, calcium aluminates, calcium sulfates, ceravital, corals, ferric-calcium-phosphorus oxides, hydroxyapatites, dense hydroxyapatites, silica, silicon boride, silicon oxide, silicon nitride, titanium oxide, titanium nitride, tri-calcium phosphate, zinc-calcium-phosphorus oxides, zinc sulfate-calcium-phosphorus oxides, zinc oxide, zirconia, or a combination thereof. In another example, the ceramic powder can be aluminum oxide. In yet another example, the ceramic powder can be hydroxyapatite. In certain specific examples, the material can be an oxide ceramic powder selected from alumina, silica, zirconia, or oxide glass; or in other examples, can be a non-oxide ceramic powder selected from silicon nitride ($Si_3N_4$) or boron nitride (BN).

The particulate fusible build material can alternatively be a polymer powder. In one example, the polymer powder can include a polyethylene, a polylactic acid, a polyamine, a polyamide, a polyether, a polyolefin, a polyether ether ketone, or a combination thereof. In one example, the polymer powder can be a polyamide. In a further example, the polymer powder can be nylon 12. In yet another example, the polymer powder can be a thermoplastic polymer. In some examples, the polymer powder can be colorless. For example, the polymer powder can have a white, translucent, or transparent appearance.

In yet another example, the particulate fusible build material can include a glass powder. In one example, the glass powder can be silica, aluminosilicate, a silicate, sodium oxide, sodium carbonate, sodium borosilicate, soda lime glass, calcium oxide, quartz, or a combination thereof. In one example, the glass powder can be glass fibers and their composites, glasses, and/or dense and nonporous glasses.

In certain specific examples, the particulate fusible build material can include an aluminum oxide or can be nylon 12. In another example, the particulate fusible build material can include a hydroxyapitate.

The average particle size of the particulate fusible build material can vary based on the desired level of detail for the printed article. Printed articles that have greater detail may require particulate fusible build materials having a smaller average particle size. In one example, the particulate fusible build material can have an average particle size ranging from about 0.01 μm to about 200 μm. In another example, the particulate fusible build material can have an average particle size ranging from about 10 μm to about 100 μm. In yet another example, the particulate fusible build material can have an average particle size ranging from about 5 μm to about 75 μm.

Turning now to the fusing ink and the binding ink. In one example, the binding ink can be independently selected from latex based inks, UV curable based inks, IR curable based inks, polyurethane based inks, or other polymer-based jettable fluids. Fusing inks can be based on dispersions of electromagnetic radiation (e.g., microwave wavelength range) absorbing particles, such ferromagnetic oxides (e.g., iron oxide ($Fe_3O_4$)), semiconductors (e.g., silicon carbide (SiC), copper oxide (CuO), etc.), conductive materials (e.g., carbon black, graphite, metal particles, etc.), or a combination thereof. In one example, the binding ink, can be latex based inks. In another example, such a latex based ink can be based on HP® 300 latex ink (Hewlett-Packard Inc., California). In another example, the binding ink can be a UV curable ink or an IR curable based ink.

Figure 2:
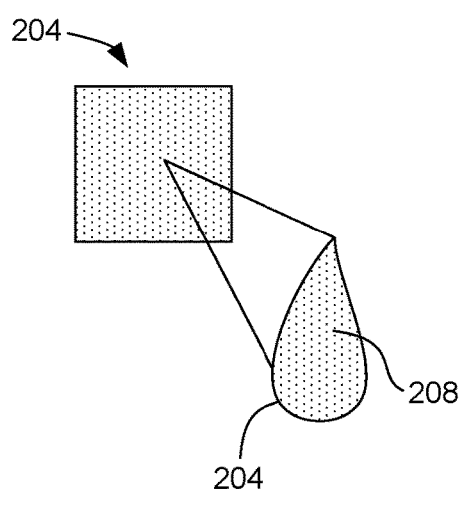
FIG. 2 schematically displays an example fusing ink in accordance with the present disclosure.

Turning specifically to the fusing ink and FIG. 2, the fusing ink 204 can include a fusing agent 208. The fusing agent can be a material that is capable of absorbing energy, such as electromagnetic energy, and generating heat to fuse the particulate fusible build material. In one example, the fusing agent can be sensitive to electromagnetic radiation such as microwave energy, radio frequency, visible light, infrared light, ultraviolet light, or a combination thereof. In a specific example, the fusing agent can be sensitive to microwave energy. In another example, the fusing agent can be sensitive to infrared light. In yet another example, the fusing agent can be sensitive to ultraviolet light. In one example, as printed parts are may fully formed or thick portions of parts are fully formed before solidifying or cuing, the use of electromagnetic energy that can penetrate and fuse the thickened part or complete part (in some instances) can be desirable. Microwave energy, for example, can be used in some examples as it can readily penetrate a printed part throughout its thickness after it is formed (rather than on a layer by layer basis), as discussed hereinafter in more detail. Specific examples of fusing agents that can be sensitive to electromagnetic radiation can include semiconductor material, a conductive material, a magnetic material, a polarizable dielectric material, or a combination thereof. In one example, the fusing agent can be carbon black. In yet another example, the fusing agent can be ferrite. Other materials that can be used include tungsten bronzes, molybdenum bronzes, metal nanoparticles, conjugated conductive polymers, or combinations thereof. In other examples, the fusing agent can include a material that can be used to increase the rate of fusing and/or lower the melting point of the fusible particulate build material.

In other examples, the fusing agent can be a dye or pigment that can be sensitive to infrared or near infrared light. Examples of infrared or near-infrared absorbing dyes include pyrimidinetrione-cyclopentylidenes, guaiazulenyl dyes, croconium dyes, aminium dyes, tetraaryldiamine dyes, cyanine dyes, pthalocyanine dyes, dithiolene dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, or combinations thereof.

In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that includes a backbone with alternating double and single bonds. In many cases, the fusing agent can have a peak absorption wavelength in the range of 800 nm to 1400 nm. A variety of near-infrared pigments can also be used. Additional near-infrared pigments can include silicates. Silicates can have the same or similar counterions as phosphates.

In a further example, the fusing agent can be any material that can effectively increases the rate of fusing for a given temperature or can allow for fusing of the particulate fusible build material at a lower temperature. Typically, the particles in the particulate fusible build material can be fused together when the temperature increases to the melting or softening temperature of the particulate fusible build material. As used herein, "melting point" refers to the temperature at which the particulate fusible build material transitions from a crystalline phase to a pliable more amorphous phase. Examples of this type of fusing agent can include glasses for ceramic or metal particulate fusible build materials and lower temperature polymers for polymeric particulate fusible build materials. In another example, the fusing agent can be a material that can cause a chemical modification at the particle surface. For example, magnesium oxide can be used as the fusing agent when the particulate fusible build material is a ceramic powder. In another example, the fusing agent may be a solvent when the particulate fusible build material is a polymer powder. In yet another example, the fusing agent can be any agent that removes an oxide when the particulate fusible build material is metal based powder.

The amount of fusing agent in the fusing ink can vary depending on the type of fusing agent. In some examples, the concentration of fusing agent in the fusing ink can be from 0.1 wt % to 20 wt %. In one example, the concentration of fusing agent in the fusing ink can be from 0.1 wt % to 15 wt %. In another example, the concentration can be from 0.5 wt % to 10 wt %. In yet another example, the concentration can be from 1 wt % to 5 wt %. In a particular example, the concentration can be from 0.5 wt % to 5 wt %.

In some examples, additional pigments and/or dyes can be included as colorants to modify the color (or lack thereof) of the fusing ink. This may be particularly the case when the fusing agent is not a colorant. which can be the case for many fusing inks containing polymer binder particles, such as latexes.

In one example, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland). Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, Acid Black 2, Pacified RB31, and Projet™ Fast Black 2 (available from FUJIFILM Imaging Colorants Inc.).

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, Heliogen® Green L 9140, Chromophtal® Yellow 3G, Chromophtal® Yellow GR, Chromophtal® Yellow 8G, Igrazin® Yellow SGT, Igralite® Rubine 4BL, Monastral® Magenta, Monastral® Scarlet, Monastral® Violet R, Monastral® Red B, and Monastral® Violet Maroon B (BASF, Germany).

The following black pigments are available from Cabot: Monarch® 1400, Monarch® 1300, Monarch® 1100, Monarch® 1000, Monarch® 900, Monarch® 880, Monarch® 800, and Monarch® 700 (Cabot, Mass.). The following pigments are available from Evonik: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4 (Evonik Industries, Germany). The following pigment is available from DuPont: Tipure® R-101 (DuPont, USA).

The following pigments are available from Heubach: Dalamar® Yellow YT-858-D and Heucophthal Blue G XBT-583D (Heubach, Pa.). The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B (Clariant, N.C.).

The following pigments are available from Mobay: Quindo® Magenta, Indofast® Brilliant Scarlet, Quindo® Red R6700, Quindo® Red R6713, and Indofast® Violet (Mobay Chemical Corp., Pennsylvania). The following pigments are available from Sun Chemical: L74-1357 Yellow, L75-1331 Yellow, L75-2577 Yellow, and LHD9303 Black (Sun Chemical, New Jersey). The following pigments are available from Columbian: Raven® 7000, Raven® 5750, Raven® 5250, Raven® 5000, and Raven® 3500 (Columbian Chemicals Company, Georgia). Any other pigment and/or dye can be used that is useful in modifying the color of the above described fusing ink, and thus ultimately, the printed article.

Figure 3:
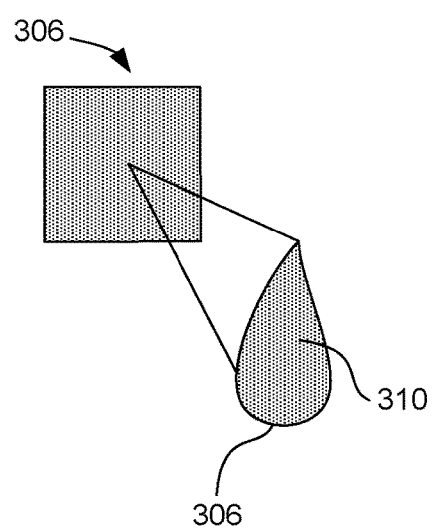
FIG. 3 schematically displays an example binding ink in accordance with the present disclosure.

Turning now to the binding ink shown in FIG. 3, the binding ink 306 can include a binding agent 310 that can be capable of providing rigidity to the particulate fusible build material. In one example, the binding agent does not fuse when exposed to the electromagnetic energy that is used to fuse the fusing agent present in the fusing ink. The binding agent can be any agent that is capable of providing rigidity to the particulate fusible build material and can vary depending upon the particulate fusible build material used. In one example, the binding agent can be a material that can use only moderate heating, e.g., from ambient to 150° C. to bind the particulate fusible build material. In another example, the binding agent can benefit from further treatment to bind the particulate fusible material. In essence, the binding ink may be used to form a container support (with the particulate fusible material) that can be used to transport a more fragile part printed with the fusible ink (shown in FIG. 2). The more fragile part, can be transported in the container support to a separate fusing device where the fragile part can be made rigid after fusing with electromagnetic energy, such as microwave energy. In another example, the binding agent can be any agent that does not fuse when exposed to the thermal energy that is used to fuse the fusing agent present in the fusing ink.

In one example, the binding agent can include salts, salts that crystallize when dried, metal salts, sugars, sugar alcohols, UV curable agents, IR curable agents, materials that lower the melting temperature of the particulate fusible build material, or a combination thereof. In one example, the binding agent can be a metal salt. In another example, the metal salt can be a magnesium salt, cobalt salt, copper salt, iron salt, zinc salt, zirconium salt, or a combination thereof. In another example, the binding agent can be a sugar. In one example, the sugar can be a monosaccharide, disaccharide, or a polysaccharide. In another example, the sugar can be an agar, arabinose, carrageenan, cellobiose, cyclodextrin, dextrin, fructose, galactose, glucose, lactose, maltose, mannose, mannotriose, sorbose, sucrose, xylose, or a combination thereof. In yet another example, the binding agent can be a sugar alcohol. In one example, the sugar alcohol or a sugar derivative and can be sorbitol, mannitol, maltitol, α-cyclodextrin, β-cyclodextrin, γ-cyclodextrin, hydroxypropyl-β-cyclodextrin, hydroxyethyl-β-cyclodextrin, hydroxyethyl α-cyclodextrin, carboxymethyl-α-cyclodextrin, carboxymethyl-β-cyclodextrin, and combinations thereof. In one example, the binding agent can be a UV curable agent. In another example, the binding agent can be an IR curable agent. In a further example, the binding agent can be an agent that lowers the melting temperature of the particulate fusible build material. In one example, the binding ink can also include water and binding can be assisted based on the liquid capillary action of the water. In another example, the binding agent can be a polymeric binder.

The amount of binding agent in the binding ink can vary depending on the type of binding agent. In some examples, the concentration of binding agent in the binding ink can be from 0.1 wt % to 15 wt %. In one example, the concentration of binding agent in the binding ink can be from 0.1 wt % to 10 wt %. In another example, the concentration can be from 0.5 wt % to 5 wt %. In yet another example, the concentration can be from 1 wt % to 5 wt %. In a particular example, the concentration can be from 0.5 wt % to 4 wt %.

The fusing ink and/or binding ink can also include jetable adhesive materials, jetable thermoplastics, solvents, highly viscous high boiling point solvents, co-solvents, surfactants, biocides, and other such materials.

Figure 4:
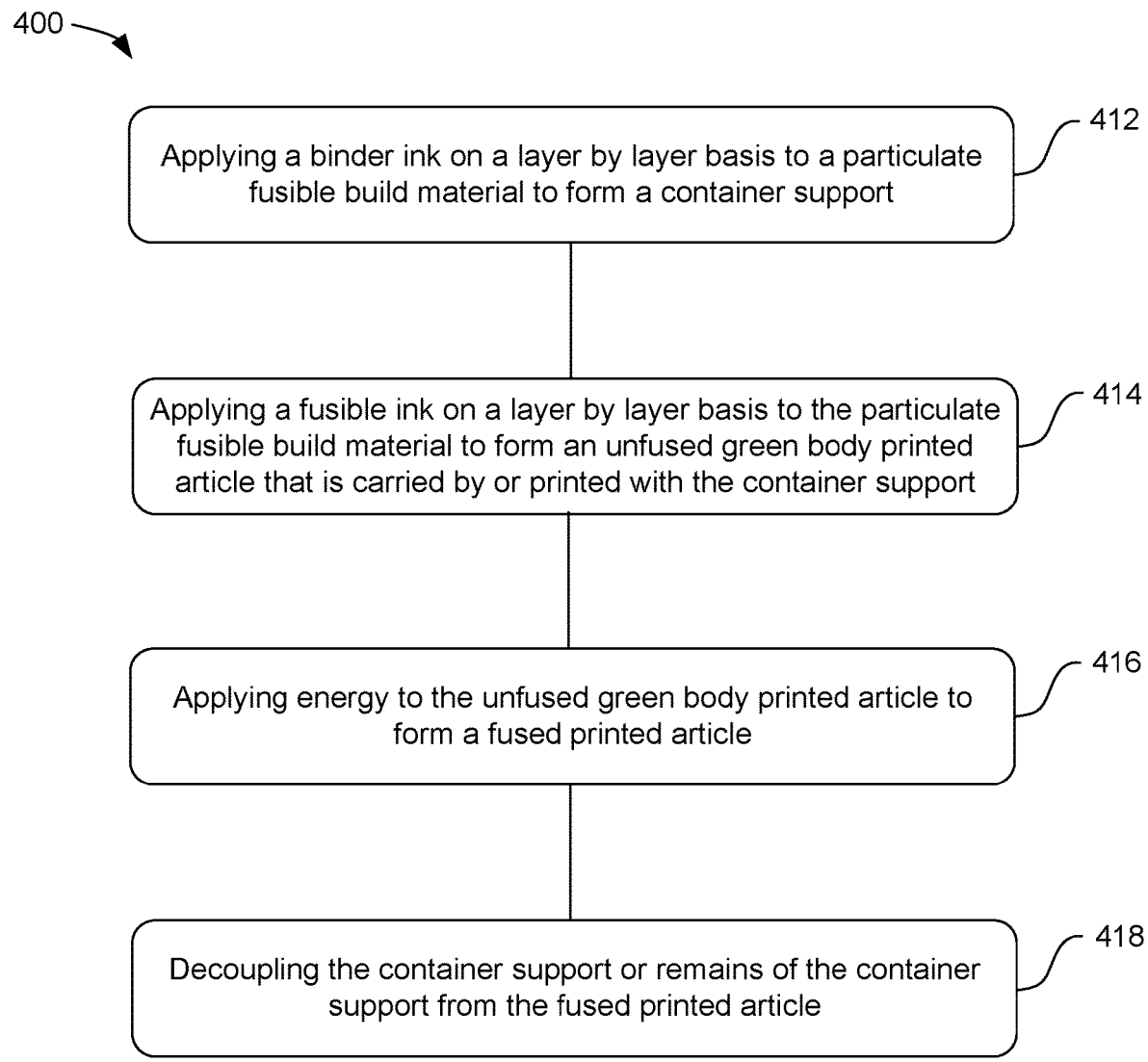
FIG. 4 displays an example method for three-dimensional printing in accordance with one example of the disclosure.

Also presented herein in FIG. 4 is a method 400 of three-dimensional printing. In one example, the method can include: applying binder ink on a layer by layer basis to a particulate fusible build material to form a container support 412, applying fusible ink on a layer by layer basis to the particulate fusible build material to form an unfused green body printed article that is carried by or printed with the container support 414, applying energy to the unfused green body printed article to form a fused printed article 416, and decoupling the container support or remains of the container support from the fused printed article 418. In one example, the particulate fusible build material, the binder ink, and the fusing ink can be as described above.

Figure 5:
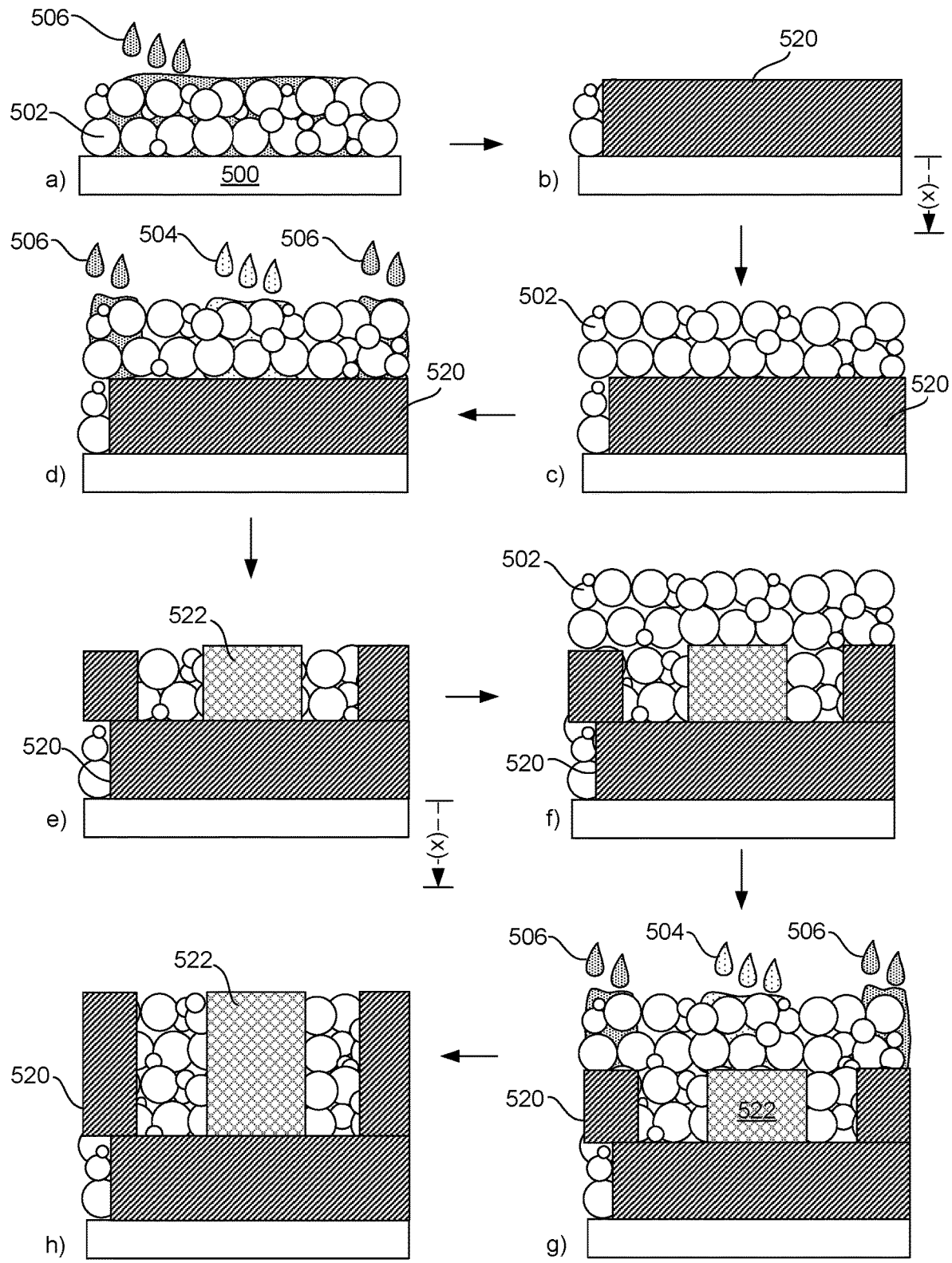
FIG. 5 schematically displays an example method for three-dimensional printing in accordance with the present disclosure.

In further detail, as shown in FIG. 5, a material set and method is schematically shown. The method is shown in various steps using a) to h) for convenience; however, it is understood that fewer or more steps can be carried out than shown in this specific example. Also, notably, reference numerals are not shown for every structure or material in every step, but it is understood that like structures are the same structure from step to step. With this in mind, a material set (502, 504, and 506) can be used by spreading a thin layer of a particulate fusible build material 502 on a platform 500 to form a powder bed. A printing head, such as an inkjet print head or a piezoelectric print head, can then be used to print a layer of fusing ink 504 and/or a layer of binding ink 506 on portions of a powder bed of the particulate fusible build material. Essentially, fusing ink is used to form thin layers of a fusible article 522 and binding ink is used to form thin layers of a container 520.

More specifically, in the example show in FIG. 5, a) and b) depict forming of a container layer 520 by printing binding ink 506 onto the particulate fusible build material 502. Next, as shown in c) a layer of particulate fusible build material is spread on the container layer to build the next layer. Steps d) and e) depict printing the next layer of the container (which in this case is the first layer of the container side walls) again by printing binding ink onto the particulate fusible build material, as well as a first layer of the fusible article 522, which is printed by applying fusible ink onto the particulate fusible build material. Steps f) to h) depict the formation of third layer, similar to that described with respect to c) to e), respectively. Additional layers can be printed similarly to form both the container and the fusible article. When each layer is sufficiently formed, the platform can be dropped a distance of "x" as shown in FIG. 5 in preparation for forming the next layer.

It is noted that the printed layers shown in FIG. 5 are merely an exemplary depiction of the fused layers that may be formed, which are simplified for explanatory purposes only. Typically, the shapes formed may be more complicated than that shown in FIG. 5. In some cases, fused layers formed using the processes described herein do not have a perfect rectangular cross section as shown in FIG. 5. The edges of the fused layers can often include partially fused particles embedded into the fused layers. This can result in a surface that may be uneven or bumpy at the scale of the individual particles. However, in some examples, the individual particles of the particulate fusible build material can be small enough that the parts printed therefrom still have a smooth appearance when viewed by the human eye.

The method can further include additional steps. In one example, the binding agent can be an agent that can be cured just by drying, or in other examples, can be cured using other energy sources. For example, UV, IR, or visible light curing, or heated curing, can be carried out to form the container before moving the container (with the fragile fusible part inside or supported thereon) to the electromagnetic energy or thermal energy source that is used to fuse the fusible part. When the curing involves applying heat, the powder bed can be heated from below and/or above the particulate build material. For example, a heat element can be included within the platform on which the particulate fusible build material rests and/or a heat lamp can be applied from above. When curing involves the use of ultraviolet or infrared energy, these energy sources can be directed to the various layers printed with the binding ink before a new layer of the particulate fusible build material is applied. In one example, the IR or UV source can be a lamp, such as a stationary lamp or a moving lamp. For example, the lamp can be mounted on a track to move horizontally across the powder bed. Such a fusing lamp can make multiple passes over the bed depending on the amount of exposure needed to fuse each layer of the binding ink. The lamp can be configured to irradiate the entire powder bed or can be configured to selectively fuse portions of the powder bed. In one example, the lamp can be matched with the binding agent in the binding ink so that the lamp emits wavelengths of light that match the peak absorption wavelengths of the binding agent.

In one example, the method can further include transporting the container support and the unfused printed (fusible) article together to a fusing system for application of the electromagnetic energy, e.g., microwave energy, radio frequency, or the like. The container can allow for safe transport of the unfused printed article to a fusing system for fusing of the article. In one example, the presence of the container that is built around the unfused printed article can provide the ability to generate more controlled heating of the article during the fusing step. For example, the container can be built to mirror the outer dimension of the unfused printed article (with a predetermined thickness of unprinted particulate fusible build material therebetween) in order to provide for relatively uniform fusing of the printed article. For example, the container support can at least partially surround the unfused printed article and can be printed at a distance away from the unfused printed article such that a portion of the particulate fusible build material can be located between the container support and the unfused printed article. In one example, the particulate fusible build material that is trapped between the container and the unfused printed article can then be used to act as an insulator when applying the thermal or electromagnetic energy to the unfused printed article.

The amount and quantity of the particulate fusible build material between the container and the printed article can vary based on the printing and fusing parameters. In one example, the binder ink can be applied to the particulate fusible build material at a predetermined distance from the fusible ink in order to control a width and a volume of the particulate fusible build material that is contained between the container support and the unfused printed article. This can be useful when the particulate fusible build material is used as an insulator during application of the thermal heat to the unfused printed article.

The distance at which the container is printed away from the unfused article can be used to precisely control an amount of the particulate fusible build material the remains between the container and the unfused article. Varying the amount of the particulate fusible build material can allow for the manufacturer to control the fusing of the final article, by controlling the temperature that is delivered to each area of the unfused printed article when applying the energy.

In one example, the temperature that is delivered can be controlled by varying the distance between the container and the article. As the distance varies, the amount of the particulate fusible build material between the container and article also varies which provides varying insulation, which in turn can allow the manufacturer to control the heating of the article. In one example, the distance can be such that each layer of the container can be formed at equidistance from the layers of the unfused article. This can allow for relatively uniform heating of the unfused printed article. In another example, the distance can be varied between the layers of the container and the printed article so that the amount of particulate fusible build material between the container and the printed article varies between the layers. This can allow for different portions of the printed article to be heated to different temperatures. In some examples, the container can be printed adjacent to the article in order to minimize any of the particulate fusible build material that is trapped between the article and the container.

Figure 6:
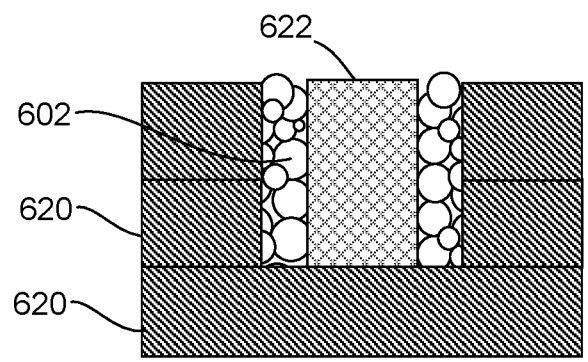
FIG. 6 schematically displays an example container support and a printed article formed in accordance with the present disclosure.
Figure 7:
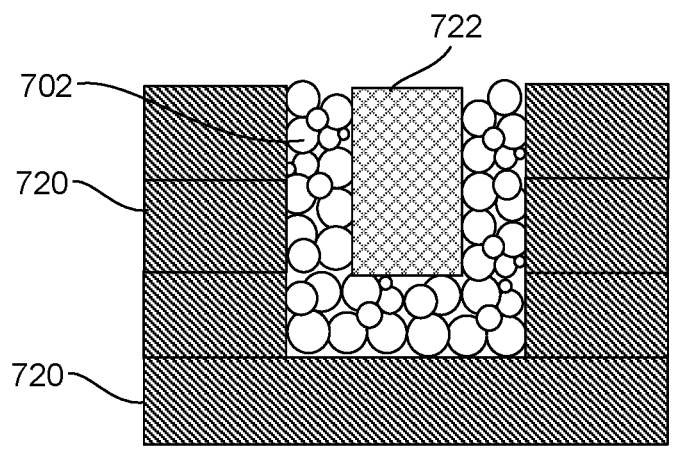
FIG. 7 schematically displays an alternative example container support and a printed article formed in accordance with the present disclosure.

FIG. 6 depicts a printed article 622 that is prepared to be carried by a printed container 620. In this example, the printed article is supported directly on the printed container from beneath as well as the indirectly from the sides with the particulate fusible build material 602 therebetween. FIG. 7 depicts a similar build arrangement, but in this instance, the printed container 720 is supported indirectly from below and from the sides by the printed container 720 with particulate fusible build material 702 therebetween. The printed article can be formed from a fusing ink printed on a particulate fusible build material. The fusing ink can include a fusing agent capable of absorbing thermal energy or electromagnetic energy and fusing the particulate fusible build material. The container can be formed using the binding ink (including the binding agent) which is capable of providing rigidity to the particulate build material, but which does not fuse when exposed to the thermal energy or electromagnetic energy that the fusing agent is capable of absorbing.

It is noted that, as used in this specification and the appended claims, the singular forms "a," "an," and "the" include plural referents unless the context clearly dictates otherwise.

"Binding ink" and "binder ink" can be used interchangeably herein.

As used herein, "dye" refers to compounds or molecules that absorb electromagnetic radiation or certain wavelengths thereof. Dyes can impart a visible color to an ink if the dyes absorb wavelengths in the visible spectrum.

"Fusing ink" and "fusible ink" can be used interchangeably herein.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

The term "particulate fusible build material" refers to relatively fine particles with an average particle size from 0.01 μm to 200 μm. "Average" with respect to properties of particles refers to a number average unless otherwise specified. Accordingly, "average particle size" refers to a number average particle size. Additionally, "particle size" refers to the diameter of spherical particles, or to the longest dimension of non-spherical particles. The term "particulate fusible build material" can be used interchangeably with "powder," "particle," or "particulate."

As used herein, "unfused printed article" and/or "fusible article" refers to a printed article that has not been fused. Unfused printed articles can include printed articles that have some level of rigidity or cohesiveness and is typically somewhat fragile; however, the article has not yet been fused to create a rigid article.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Fusing Ink Formulations

Three different example fusing ink formulations were prepared. Table 1 provides a carbon fusing ink formulation. Table 2 provides a ferromagnetic fusing ink formulation. Table 3 provides a silica fusing ink formulation. Fusing ink formulations are used to form green body parts (along with the particulate fusible build material) which are ultimately fused to form finished printed articles that are thermally or electromagnetically fused.

TABLE 1

Carbon black fusing ink formulation

| Component | Wt % |
|---|---|
| 1-(2-Hydroxyethyl)-2-pyrrolidone (co-solvent) | 21 |
| Cab-O-Jet 300 Carbon Black Solids | 8 |
| Surfynol 465 (surfactant) | 0.4 |
| Water | Balance |

TABLE 2

Ferromagnetic fusing ink formulation

| Component | Wt % |
|---|---|
| Co—Mn-Ferrite Dispersion (per dry ferrite mass) | 30 |
| 2-Pyrrolidone (co-solvent) | 10 |
| DANTOCOL ® DHE (co-solvent) | 10 |
| SURFYNOL ® 465 (surfactant) | 0.2 |
| PROXEL ® GXL Biocide | 0.05 |
| Water | Balance |

TABLE 3

Silica fusing ink formulation

| Component | Wt % |
|---|---|
| SNOWTEX ® ST-30LH $SiO_2$ (Mv~30 nm) (per dry material) | 20 |
| 2-Pyrrolidone (co-solvent) | 17 |
| SILQUEST ® A-1230 (co-solvent) | 5 |
| SURFYNOL ® 465 (surfactant) | 0.2 |
| PROXEL ® GXL (biocide) | 0.05 |
| Water | Balance |

Example 2—Binding Ink Formulations

Two different example binding ink formulations were prepared. Table 4 provides a latex binding ink formulation. Table 5 provides a sucrose binding ink formulation. Binding ink formulations are used to form container supports (along with the particulate fusible build material) which are used to protect and transport green body parts prior to fusing. In some examples, when the green body part is fused at temperatures often greater than about 500° C., the binding agent may burn off and the powder used to form the container support remains or reverts to an unbound state.

TABLE 4

Latex binding ink formulation

| Component | Wt % |
|---|---|
| 2-methyl-1,3-propanediol (co-solvent) | 5 |
| 2-Pyrrolidinone (co-solvent) | 15 |
| Tergitol 15-S-7 (surfactant) | 0.5 |
| Capstone FS-31 | 0.5 |
| Crodafos N-3 Acid | 0.2 |
| Acid Blue 9 Dye Solution (colorant) | 0.1 |
| Acrylic Latex (Mv~200 nm) (binding agent) | 15 |
| Water | Balance |

TABLE 5

Sucrose binding ink formulation

| Component | Wt % |
| --- | --- |
| 1-(2-Hydroxyethyl)-2-pyrrolidone (co-solvent) | 17 |
| Sucrose (binding agent) | 30 |
| Acid Blue 9 Dye Solution (colorant) | 0.1 |
| Surfynol 465 (surfactant) | 0.4 |
| Acticide M20 (biocide) | 0.25 |
| Water | Balance |

Example 3—Printed Article and Container Support for Transport

Figure 8:
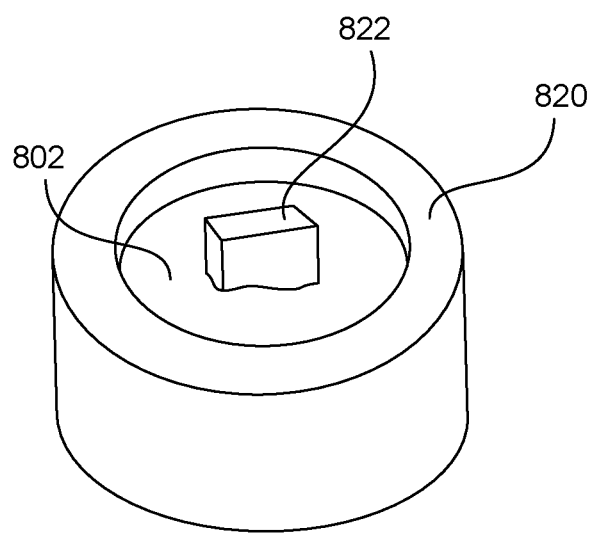
FIG. 8 schematically displays a perspective view of an example container support and a printed article formed in accordance with the present disclosure.

A nylon 12 powder of about 60 μm average particle size is spread in a thin layer of approximately 100 μm thick on a platform to form a powder bed. Inkjet print heads are used to print a layer of a fusing latex ink containing a fusing agent of approximately 4 wt % carbon black (similar to the Table 1 formulation, but with half the carbon black pigment and increased liquid vehicle), and a binding latex ink containing a binding agent approximately 15 wt % of a latex type polymer (similar to the formulation of Table 4). The respective inks are printed using 12 ng drop volumes. Infrared light is applied at least over the binding ink. The platform is moved down, and a new layer of the nylon 12 powder is spread followed by another layer of binding and/or fusing ink being printed. Again, infrared light is applied to harden the binding ink and nylon 12 powder of the container support 820 shown in FIG. 8. The process is repeated to form additional layers until a complete printed article 822, which was somewhat fragile, and container support with loose particulate fusible build material 802 positioned there between. The container with the unfused article inside can then be moved using the container as a support without damaging the fragile printed article in preparation for fusing in an electromagnetic energy "oven."

Example 4—Printed Article and Container Support for Transport and Fusing

An aluminum oxide ceramic powder having an average particle size ranging from 10 μm to 30 μm is spread in a thin layer approximately 100 μm on a platform to form a powder bed. Inkjet print heads are used to print the powder surface with combination of three microwave absorbing fusing inks. The first ink contained 8 wt % carbon black particles (Mv~100 nm) and a liquid vehicle, as set forth in Table 1. The second ink contained a dispersion of manganese cobalt ferrite nano-particles (Mv~30-40 nm) at 30 wt % load carried by a liquid vehicle, as set forth in Table 2. These inks are separately printed at about a 1:1 weight ratio to form a green body printed article which is suitable for subsequent fusing. More specifically, in order to form a green body printed article, both inks are applied at a 26 gsm ink flux density per each 100 μm thick alumina powder layer. Additionally, an about 15 wt % latex type binding ink (with the latex as the binding agent as set forth in Table 4) is also printed at locations appropriate to form a container support surrounding the printed article, again similar to that shown in FIG. 8. The inks are all printed using 12 ng drop weights. A new layer of the aluminum oxide powder is then spread and another layer of the binding ink and fusing inks, and process is repeated to form additional layers until a complete green body printed article 822 and container support 820 is printed, with unprinted particulate fusible build material 802 there between. The green body printed article is then heated in a 2.1 kW microwave furnace at full power for about 10 minutes, reaching a temperature between 1400° C. and 2000° C. to fuse the printed article. Following fusing of the printed article, the latex binding agent is burned off, making the former container material easily removable from the now fused printed article.

What is claimed is:

1. A material set comprising:
    a particulate fusible build material having an average particle size ranging from about 0.01 μm to about 200 μm, wherein the particulate fusible build material is a polymer powder, a metal composite powder, or a combination thereof;
    a fusing ink comprising a fusing agent in a first liquid vehicle, wherein the fusing agent fuses the particulate fusible build material when exposed to electromagnetic energy or thermal energy resulting in a temperature greater than about 500° C.; and
    a binding ink comprising a binding agent in a second liquid vehicle, wherein the binding agent temporarily binds the fusible build material when exposed to moderate temperatures ranging from ambient to 150° C. and burns off or degrades at the temperature greater than about 500° C.

2. The material set of claim 1, wherein the fusing agent is carbon black, a metallic and ferromagnetic oxide, a semiconductor material, a conductive material, a magnetic material, a dielectric material with high polarizability, or a combination thereof.

3. The material set of claim 1, wherein the binding agent comprises salt, salt that crystallizes when dried, metal salt, sugar, sugar alcohol, latex polymer, or a combination thereof.

4. The material set of claim 1, wherein the polymer powder is selected from the group consisting of a polyethylene, a polylactic acid, a polyamine, a polyamide, a polyether, a polyolefin, a polyether ether ketone, and a combination thereof.

5. The material set of claim 1, wherein the fusing agent is tungsten bronze, molybdenum bronze, metal nanoparticles, conjugated conductive polymers, or combinations thereof.

6. The material set of claim 1, wherein the particulate fusible build material has an average particle size ranging from about 5 μm to about 75 μm.

7. A material set comprising:
    a particulate fusible build material having an average particle size ranging from about 0.01 μm to about 200 μm, wherein the particulate fusible build material is a metal composite powder;
    a fusing ink comprising a fusing agent in a first liquid vehicle, wherein the fusing agent fuses the particulate fusible build material when exposed to electromagnetic energy or thermal energy resulting in a temperature greater than about 500° C.; and
    a binding ink comprising a binding agent in a second liquid vehicle, wherein the binding agent temporarily binds the fusible build material when exposed to moderate temperatures ranging from ambient to 150° C. and burns off or degrades at the temperature greater than about 500° C.

8. The material set of claim 7, wherein the fusing agent is a conductive material, a magnetic material, a polarizable dielectric material, or a combination thereof.

9. The material set of claim 7, wherein the fusing agent is metal nanoparticles.

10. The material set of claim 7, wherein the binding agent comprises salt, salt that crystallizes when dried, metal salt, sugar, sugar alcohol, latex polymer, or a combination thereof.

11. A material set comprising:
- a particulate fusible build material having an average particle size ranging from about 0.01 μm to about 200 μm, wherein the particulate fusible build material is a polymer powder;
- a fusing ink comprising a fusing agent in a first liquid vehicle, wherein the fusing agent fuses the particulate fusible build material when exposed to electromagnetic energy or thermal energy; and
- a binding ink comprising a binding agent in a second liquid vehicle, wherein the binding agent temporarily binds the fusible build material when exposed to moderate temperatures ranging from ambient to 150° C., but does not fuse when exposed to electromagnetic energy or thermal energy.

12. The material set of claim 11, wherein the polymer powder is a polyethylene, a polylactic acid, a polyamine, a polyamide, a polyether, a polyolefin, a polyether ether ketone, or a combination thereof.

13. The material set of claim 11, wherein the polymer powder is nylon 12.

14. The material set of claim 11, wherein:
- the fusing agent is carbon black, tungsten bronze, molybdenum bronze, metal nanoparticles, conjugated conductive polymers, dye or pigment sensitive to infrared or near infrared light, or combinations thereof; and
- the binding agent comprises salt, salt that crystallizes when dried, metal salt, sugar, sugar alcohol, latex polymer, or a combination thereof.

15. The material set of claim 11, wherein:
- the concentration of the fusing agent in the fusing ink is from 1 wt % to 5 wt %; and
- the concentration of the binding agent in the binding ink is from 1 wt % to 5 wt %.

* * * * *